(12) United States Patent
Brown et al.

(10) Patent No.: US 12,273,417 B2
(45) Date of Patent: Apr. 8, 2025

(54) SYSTEM AND METHOD FOR MANAGING END POINT PRESENTING DEVICES

(71) Applicant: Dell Products L.P., Round Rock, TX (US)

(72) Inventors: Michael Emery Brown, Austin, TX (US); Ajay Shenoy, Bangalore (IN); Mahesh Babu Ramaiah, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 35 days.

(21) Appl. No.: 18/175,804

(22) Filed: Feb. 28, 2023

(65) Prior Publication Data

US 2024/0291890 A1    Aug. 29, 2024

(51) Int. Cl.
| | |
|---|---|
| G06F 15/16 | (2006.01) |
| G06F 9/54 | (2006.01) |
| H04L 67/125 | (2022.01) |

(52) U.S. Cl.
CPC ............. *H04L 67/125* (2013.01); *G06F 9/54* (2013.01)

(58) Field of Classification Search
CPC ................................ H04L 67/125; G06F 9/54
USPC ......................................................... 709/217
See application file for complete search history.

(56) References Cited

U.S. PATENT DOCUMENTS

| | | | |
|---|---|---|---|
| 10,616,314 B1* | 4/2020 | Plenderleith | H04L 67/1008 |
| 2004/0015566 A1* | 1/2004 | Anderson | G06Q 20/042 |
| | | | 709/219 |
| 2009/0217346 A1* | 8/2009 | Manring | H04L 63/102 |
| | | | 726/1 |
| 2018/0014480 A1* | 1/2018 | Montgomery | A01G 25/16 |
| 2018/0205645 A1* | 7/2018 | Bays | H04L 49/602 |
| 2020/0409688 A1* | 12/2020 | Rouland | G06F 8/71 |

FOREIGN PATENT DOCUMENTS

WO    WO-2018125250 A1 *    7/2018    ............... G06F 8/41

* cited by examiner

*Primary Examiner* — Imad Hussain
(74) *Attorney, Agent, or Firm* — WOMBLE BOND DICKINSON (US) LLP

(57) ABSTRACT

Methods and systems for managing operation of data processing systems are disclosed. To manage operation of the data processing systems, the data processing systems may present unified interfaces to management systems. The unified interfaces may be used to manage the operation of any number of end point presenting devices hosted by the data processing systems. The unified interface may allow for the end point presenting devices without requiring that the management systems directly interact with the end point presenting devices.

20 Claims, 7 Drawing Sheets

SYSTEM AND METHOD FOR MANAGING END POINT PRESENTING DEVICES

FIELD

Embodiments disclosed herein relate generally to device management. More particularly, embodiments disclosed herein relate to systems and methods to manage the operation of data processing systems in a distributed system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
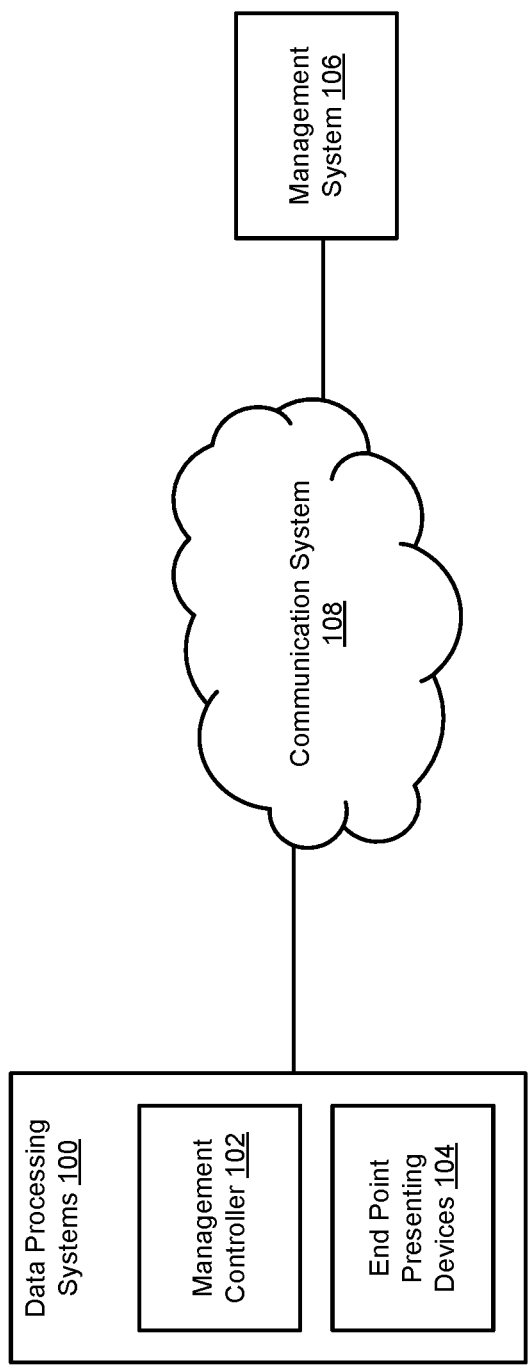
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. To manage the operation of data processing systems, a management system may obtain information regarding their operation and update their operation based on the obtained information.

The data processing systems, and some devices hosted by the data processing systems, may be implemented using end point presenting devices. An end point presenting device may be a device that is able to present itself to the management system in a distributed environment. To do so, the end point presenting devices may implement network end points to which communications from the management system may be directed.

However, if the number of end point presenting devices hosted by a data processing system grows over time, it may become progressively more difficult to manage the individual devices (e.g., through differences in interfaces implemented by the respective end point presenting devices) and incur additional management overhead. To manage the overhead and reduce complexity for managing data processing systems, the data processing systems may present a unified interface through which multiple end point presenting devices may be managed.

The unified interface may present operations reflecting the capabilities, operation information, and/or other information regarding the end point presenting devices hosted by a data processing system. The unified interface may be extensible thereby allowing for information for any number of end point presenting devices to be provided via the unified interface.

To manage communications with end point presenting devices, application programming interfaces may be established. The application programming interfaces may be customized to the corresponding end point presenting devices, thereby allowing functionality of the end point presenting devices to be invoked by the unified interface. The application programming interfaces may be established, for example, during a discovery, enumeration, and setup process.

By doing so, any number of end point presenting devices may be managed by a management system using a unified interface. Thus, embodiments disclosed herein may address, among others, the technical challenge of limited computing resources for management. By consolidating management of multiple devices into a unified interface, a management system that may use the unified interface may consume fewer resources for management purposes. For example, the management system may not need to implement multiple communication schemes to communicate with different end point presenting devices, may not need to establish/maintain multiple network connections to the respective end point presenting devices, etc.

In an embodiment, a method for managing communications between a management system and end point presenting devices is provided. The method may include obtaining, by a management controller of a data processing system, a communication from the management system; identifying, by the management controller, a device interface to an end point presenting device of the end point presenting devices, the end point presenting devices being hosted by the data processing system; translating, by the management controller and via the device interface, the communication to a natively interpretable communication by the end point presenting device; and providing, by the management controller and via the device interface, the natively interpretable communication to the end point presenting device.

The method may also include, prior to obtaining the communication: enumerating, by the management controller, the end point presenting devices; establishing, by the management controller and based on the enumerated end point presenting devices, device interfaces for each of the end point presenting devices; advertising, by the management controller, the end point presenting devices to the management system; and presenting, by the management controller, a management system interface to the management system.

The management system interface may present a unified interface for communication with all of the end point presenting devices and the data processing system. The management system interface may include a Representational State Transfer (REST) Application Programming Interface (API).

The device interface may include an API based on capabilities of the end point presenting device, and the REST API advertises the end point presenting device based on the API.

Establishing the device interfaces may include identifying, by the management controller, an instance of the API published by a trusted entity; and generating the device interface based on the instance of the API.

The instance of the API may be identified by performing a matching operation that does not uniquely associate the instance of the API with a type of the end point presenting device.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer-implemented services, the system may include any number of data processing systems 100. Data processing systems 100 may provide the computer implemented services to users of data processing systems 100 and/or to other devices (not shown), and/or may cooperate with other devices that provide the computer implemented services. Different data processing systems may provide similar and/or different computer implemented services.

For example, any of data processing systems 100 may be members of cloud environments that provide the computer implemented services. The cloud environments may include any number of devices that provide computer implemented services.

To provide the computer-implemented services, data processing systems 100 may include various hardware components (e.g., processors, memory modules, storage devices, etc.) and host various software components (e.g., operating systems, application, startup managers such as basic input-output systems, etc.). These hardware and software components may provide the computer-implemented services via their operation.

To provide certain computer-implemented services, the hardware and/or software components may need to operate in predetermined manners. If the hardware and/or software components do not operate in the predetermined manners, then a data processing system may be unable to provide all, or a portion, of the computer-implemented services that it normally provides.

In general, embodiments disclosed herein may provide methods, systems, and/or devices for managing the operation of data processing systems 100. To manage the operation of data processing system 100, management system 106 may (i) collect information regarding the operation of a data processing system, and/or components thereof, (ii) modify the operation of the data processing system, and/or components hereof. By doing so, management system 106 may manage the operation of any number of data processing systems 100. By doing so, the data processing systems may be more likely to successfully provide desired computer implemented services over time.

To collect information and modify the operation of the data processing system, management system 106 may communicate with data processing systems 100. However, due to the proliferation of devices with self-report and/or self-management capabilities, any of data processing systems 100 may include any number of end point presenting devices 104.

An end point presenting devices may be a hardware device that may present itself to management systems for management purposes. For example, an end point presenting device may be a smart network interface card, a data processing unit, or other type of device that may present itself to external systems as a separately manageable device from a host data processing system.

However, if end point presenting device 104 present themselves as being separate from a host data processing system, management of the data processing system may be more difficult. For example, it may not be clear which data processing system hosts an end point presenting device, and how modification of the end point presenting device may impact operation of a host data processing system.

Additionally, the computational overhead for communicating with multiple end point presented by devices of a single data processing system may be increased when compared to communicating with a single end point for management of a data processing system. For example, if different end point presenting devices 104 implement different communication schemes, then management system 106 may also need to implement corresponding communication schemes thereby placing additional computational overhead for management of data processing systems.

To reduce the complexity of managing data processing system, reduce the computational overhead for management, and/or for other benefits, a data processing system in accordance with an embodiment may present a single, unified end point usable by management system 106 to manage all of the end point presenting devices as well as the host data processing system.

To present a unified end point, each of data processing systems 100 may host an instance of management controller 102. Management controller 102 may manage communications between (i) end point presenting devices and a host data processing system, and (ii) management system 106.

For example, management controller 102 may present a Representational State Transfer (REST) Application Programming Interface (API) to management system 106 (e.g., accessible via communication system 106). The REST API may include functionality to obtain information regarding end point presenting devices 104 hosted by a data processing system, provide information to end point presenting devices 104 hosted by the data processing system, and provide similar functionality for the host data processing system.

Figure 2A:
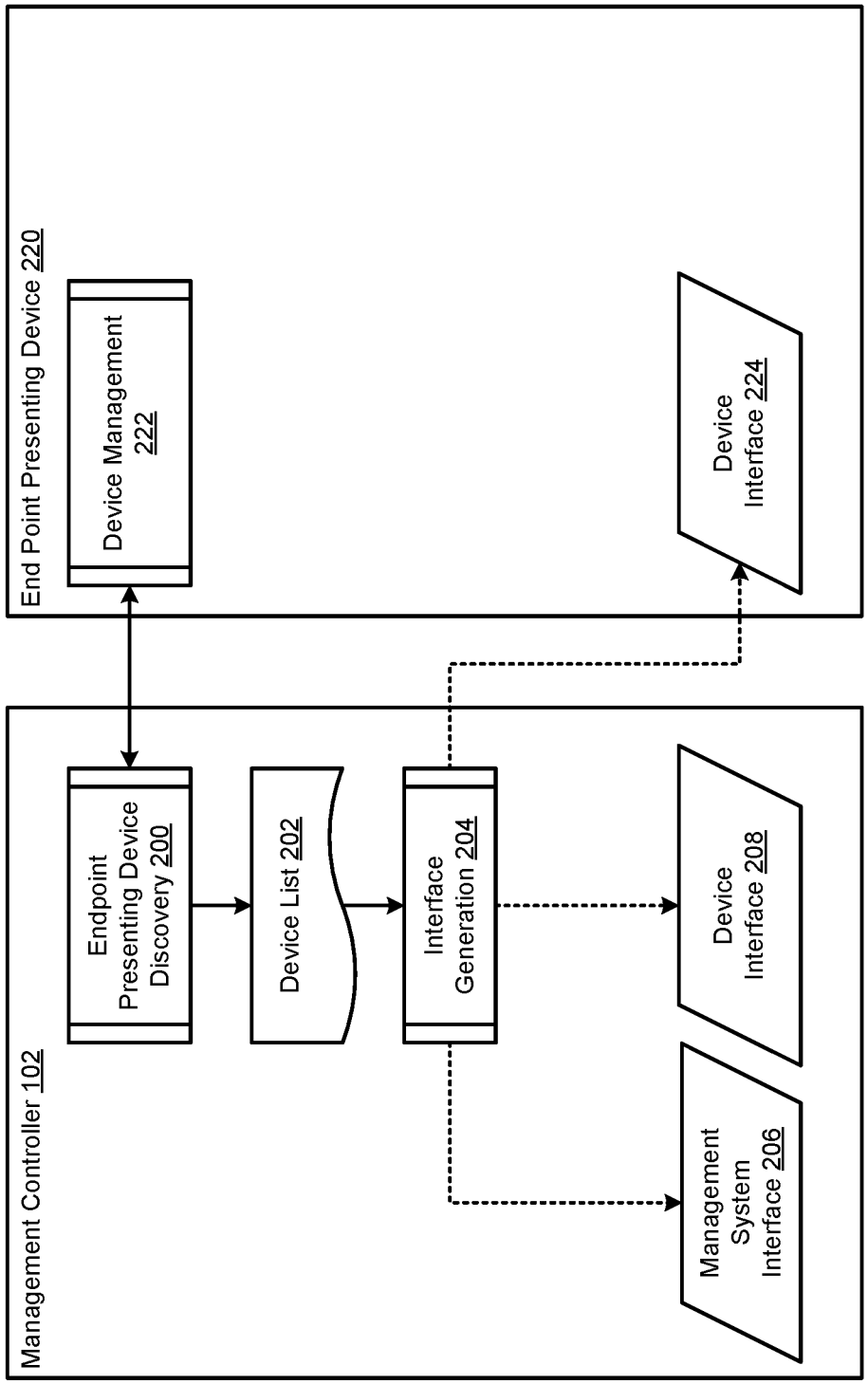
FIGS. 2A-2C show diagrams illustrating data flows in accordance with an embodiment.
Figure 2B:
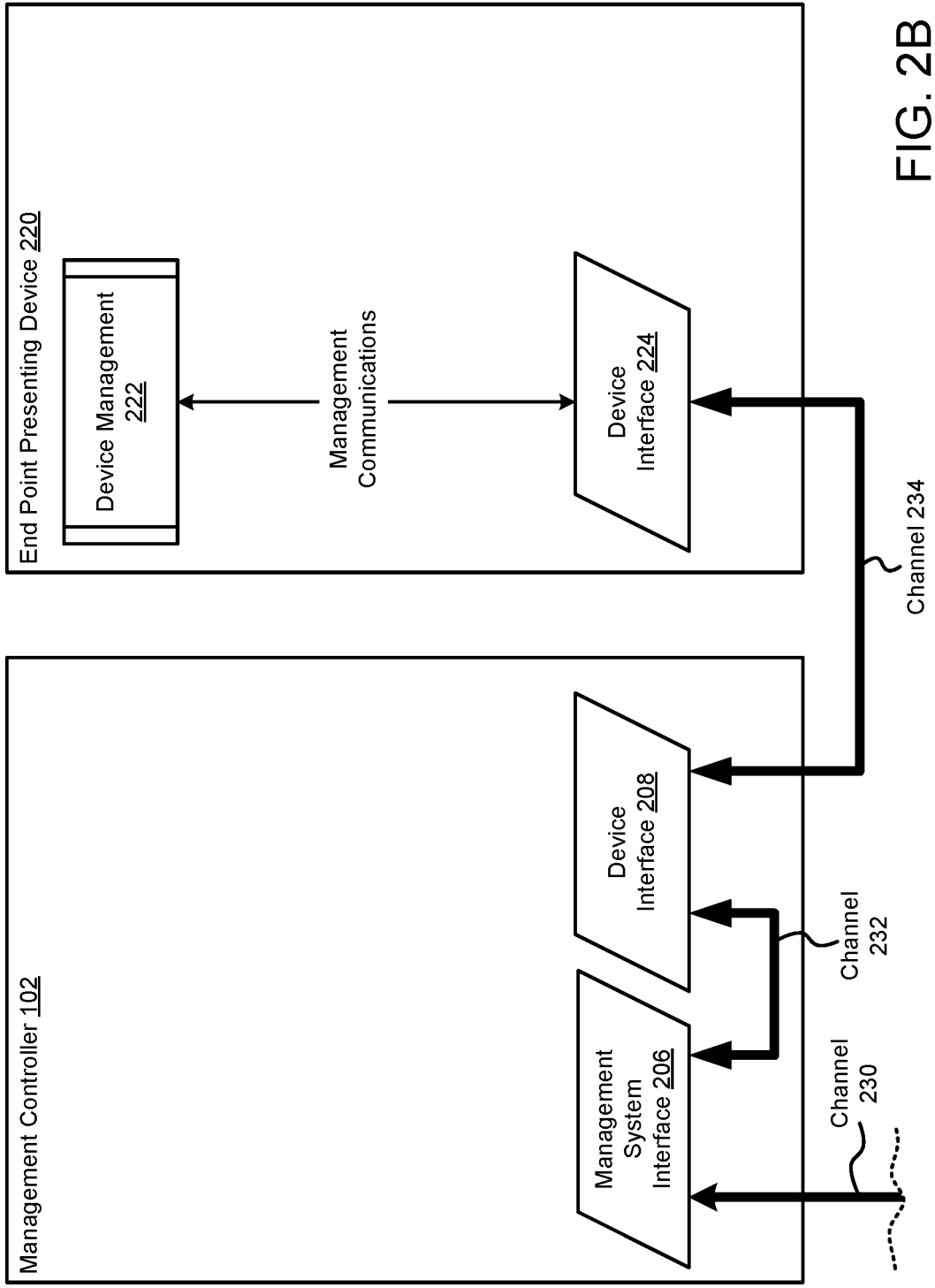

To present the REST API, management controller 102 may (i) enumerate the end point presenting devices hosted by the data processing system, (ii) establish communication interfaces (e.g., device interfaces) to the enumerated end point presenting devices, and (iii) use the communication interfaces to interact with the enumerated end point presenting devices. The communication interfaces may (i) present functionality of the end point presenting devices to the REST API, (ii) translate communications from the management system 106 received via the REST API into a format that is compatible with the end point presenting devices, and/or (iii) provide other functionality for facilitating management of the end point presenting devices by management system 106. Refer to FIGS. 2A-2B for additional details regarding interfaces used to facilitate management of data processing systems 100 by management system 106.

Figure 2C:
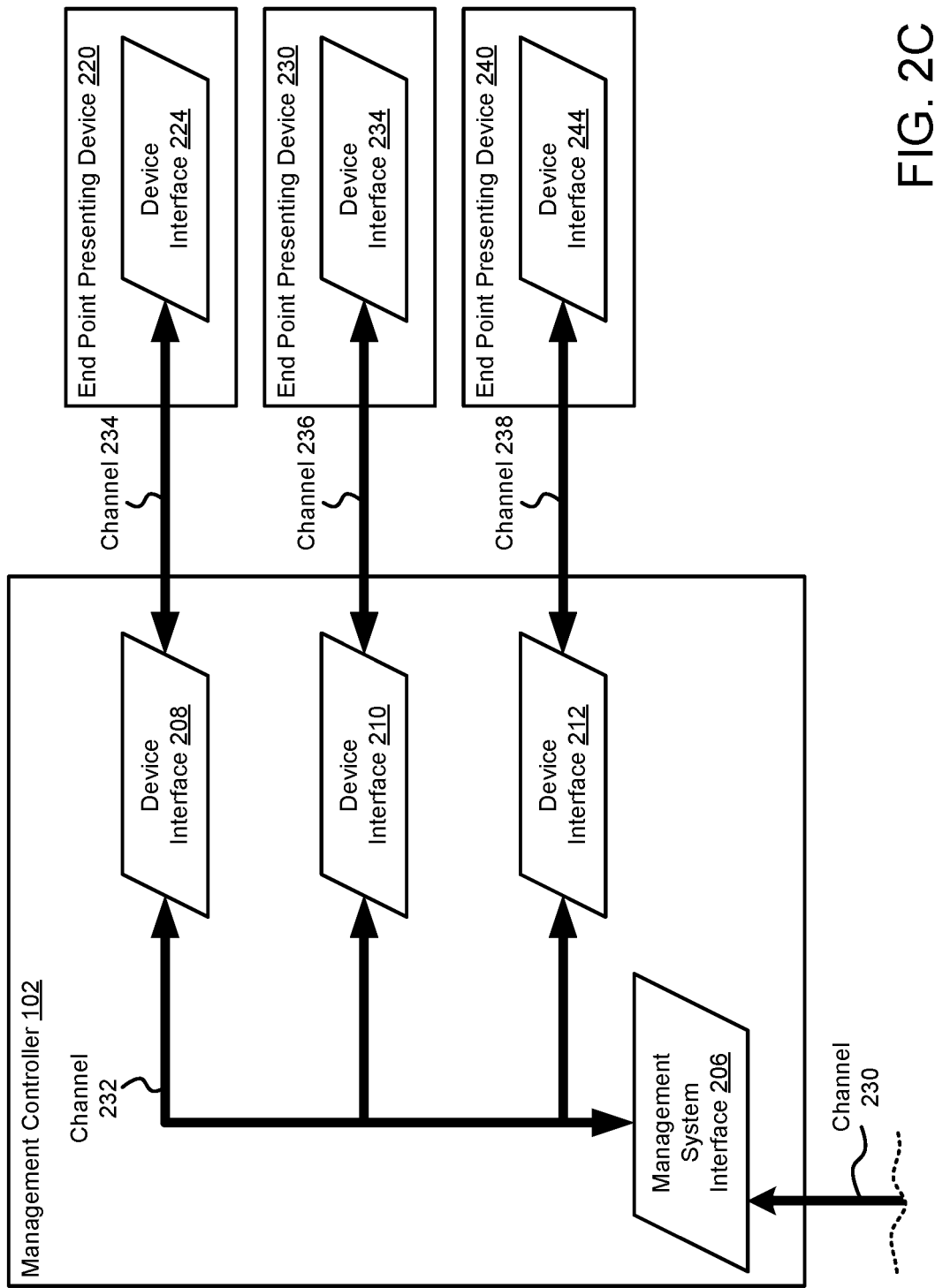

Management system 106 may manage data processing systems 100 (e.g., the processing complexes of the data processing systems) and the hosted end point presenting devices 104. To do so, management system 106 may utilize the REST API presented by management controller 102. Consequently, management system 106 may only need to implement a communication scheme compatible with the REST API rather than multiple communication schemes. Refer to FIG. 2C for additional details regarding management of multiple end point presenting deices by management system 106.

Figure 3A:
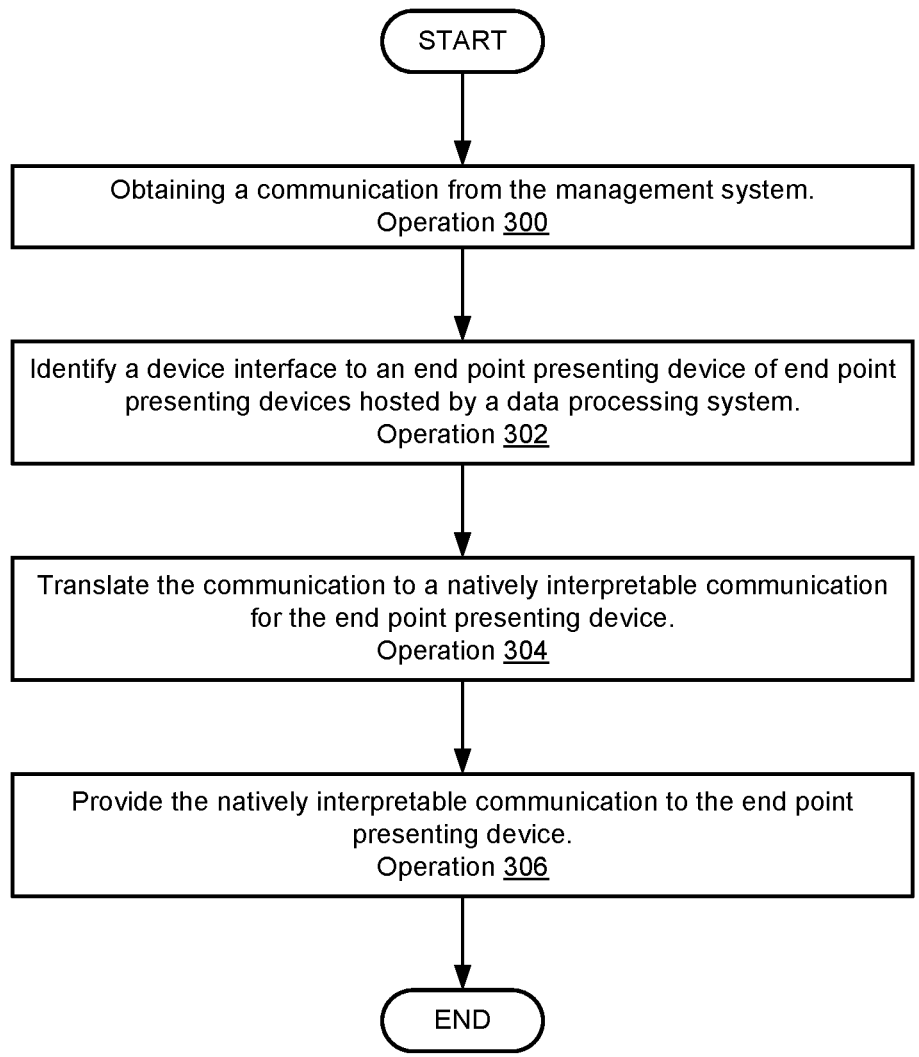
FIGS. 3A-3B show flow diagrams illustrating methods of managing operation of data processing systems in accordance with an embodiment.
Figure 3B:
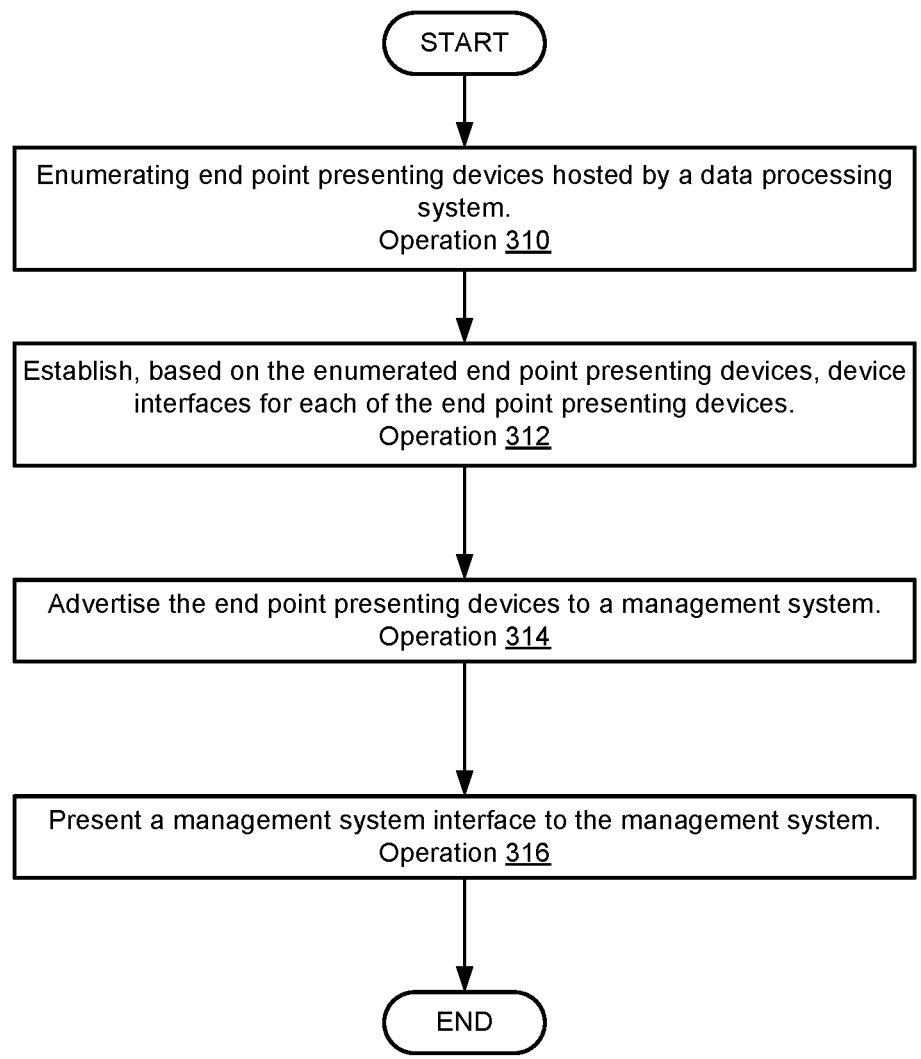

When providing their functionality, any of data processing system 100 and management system 106 may perform all, or a portion, of the method illustrated in FIGS. 3A-3B.

Any of data processing systems 100 and/or management system 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Management system 106 may be implemented with multiple computing devices. The computing devices of management system 106 may cooperatively perform processes for managing the operation of data processing systems 100. The computing devices of management system 106 may perform similar and/or different functions.

Any of the components illustrated in FIG. 1 may be operably connected to each other (and/or components not illustrated) with communication system 108. In an embodiment, communication system 108 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows implemented by and data structures used by a system over time in accordance with an embodiment are shown in FIGS. 2A-2C.

Turning to FIG. 2A, a first data flow diagram illustrating data flows, data processing, and/or other operations that may be performed by the system of FIG. 1 in accordance with an embodiment is shown.

Consider a scenario in which a data processing system hosts management controller 102 and end point presenting device 220. To manage the data processing system and end point presenting device 220, management controller 102 may present a unified interface to a management system.

To present the unified interface, management controller 102 may perform end point presenting device discovery process 200. During end point presenting device discovery process 200, management controller 102 may (i) identify end point presenting device 220 (e.g., by communicating with a device management 222 process of the device, or other entity), and (ii) generate a device list 202 or other representation of the enumerated end point presenting devices.

Once end point presenting device 220 is enumerated, management controller 102 may perform interface generation 204. During interface generation 204, device interfaces (e.g., 208, 224) may be established (e.g., through instantiation or configuration of existing interfaces). For example, to facilitate communications with end point presenting device 220, management controller 102 may install an API or other piece of software customized to facilitate use and communications with end point presenting device 220. A publisher of APIs, a manufacturer of end point presenting device 220, or another entity may host and provide access to the software. The software may include functionality to (i) invoke functionalities of end point presenting device 220 and (ii) translate communications between formats interpretable by a management system and end point presenting device 220. Additionally, the software may include functionality to provide management system interface 206 with information regarding the functionalities of end point presenting device 220. As will be discussed in greater detail below, this information may allow management system interface 206 present end point presenting device 220 to a management system that may utilize management system interface 206 natively. Consequently, the management system, through these interfaces, may be able to utilize one communication scheme to communicate with any number of end point presenting device.

Once instantiated, device interface 208 may facilitate communications with end point presenting device 220 via, for example, out of band communication channels between management controller 102 and end point presenting device 220. In this manner, a management layer for end point presenting device 220 may be established that may not disrupt, impede, or otherwise impact operation of the processing complex of the host data processing system. Likewise, when information from device interface 224 is received by device interface 208, the information may be translated into a format usable by management system interface 206 to present information to a management system.

Interface generation 204 may also include updating management system interface 206 based on the instantiated/configure device interfaces. For example, information regarding the functionalities of end point presenting device 220 may be provided to management system interface 206. Management system interface 206 may use the information to present use of end point presenting device 220 to the management system.

Turning to FIG. 2B, a second data flow diagram illustrating data flows, data processing, and/or other operations that may be performed by the system of FIG. 1 in accordance with an embodiment is shown.

Now consider a scenario where management system interface 206, device interface 208, and device interface 224 are configured and instantiated, respectively. When so configured, channel 230 may facilitate communication between management system interface 206 and a management system. Similarly, channel 232 (e.g., which may be a logical/virtual channel) may facilitate communication between management system interface 206 and device interface 208. In contrast, channel 234 may facilitate communications between device interface 208 and device interface 224.

These channels may allow a management system to communicate with any number of end point presenting device 220. For example, management system interface 206 may present functionality of end point presenting device 220 to the management system. To utilize the functionality, the management system may invoke the functionality presented by management system interface 206 by sending a corresponding communication to management controller 102. Once received, the communication may be forwarded to device interface 208. Device interface 208 may translate or otherwise modify the format of the communication to a format expected by end point presenting device 220. The communication may then be encapsulated (if necessary) and forwarded to device interface 224. Device interface 224 may then invoke the functionality (e.g., by requesting that certain actions be performed) of end point presenting device 220. For example, if interpretable by a native process, the communication may be forwarded to a management process tasked with processing communications from other devices, such as device management 222 process.

In this manner, management communications between the management system and management processes hosted by end point presenting device 220 may be exchanged without requiring that either of the devices include functionality to (i) communicate in predefined manners, and/or (ii) present end points to one another for communication purposes. Communications from device management 222 process to the management system may follow a similar, but reciprocal process.

While illustrated by way of example with respect to a single end point presenting device, it will be appreciated that management controller 102 may provide similar functionality for any number of end point presenting devices.

Turning to FIG. 2C, a third data flow diagram illustrating data flows, data processing, and/or other operations that may be performed by the system of FIG. 1 in accordance with an embodiment is shown.

To facilitate communications between a management system and multiple end point presenting devices, multiple device interfaces (e.g., 208-212, 224, 234, 244) may be established. Each of the device interfaces may be customized to facilitate communications for corresponding end point presenting devices (e.g., 220, 230, 240).

For example, different device interfaces may present different information to management system interface 206 thereby causing presentation of different functionalities for the end point presenting devices to the management system. One type of information presented via management system interface 206 may be health data. The health data may be presented by a device interface (e.g., 208) querying a corresponding end point presenting device 220 for its health status. By being customized for the end point presenting device, the device interface may include functionality (e.g., may know how to format queries and request certain types of information) to invoke the functionalities of end point presenting device 220 that are available, such as, for example, reporting its health status. Once obtained, the device interface may translate the information into a format which management system interface 206 may natively understand thereby allowing the information to be presented to the management system.

To facilitate communications between management system 206, each of the device interfaces may be operably connected to management system interface 206. The operable connections may be logical and allow for information regarding the corresponding end point presenting devices to be exposed to management system interface 206.

In an embodiment, the device interfaces may be selected based on a matching process. For example, unique types of device interfaces for each type of end point presenting device may not be available. In such scenarios, a matching process based on information regarding an end point presenting device may be used to select a type of device interface to establish. For example, if a model of the end point presenting device is not associated with a specific type of device interface, then a manufacturer of the end point presenting device may be used to identify all types of device interfaces that may be candidates. Once identified, information regarding the end point presenting device may be used to select one of the candidate types of device interfaces.

Once the interfaces are established, the end point presenting devices and interfaces may implement an update scheme to maintain accuracy of management system interface 206. For example, as the operation of the end point presenting devices changes over time, information regarding the operation may be streamed or otherwise provided to management system interface 206 so that it may accurately reflect the states of the end point presenting devices.

In an embodiment, any of management controller 102 and/or end point presenting device 220, 230, 240 are implemented using a hardware device including circuitry. The hardware device may be, for example, a digital signal processor, a field programmable gate array, or an application specific integrated circuit. The circuitry may be adapted to cause the hardware device to perform the functionality of management controller 102 and/or end point presenting device 220, 230, 240 as discussed herein. Management controller 102 and/or end point presenting device 220, 230, 240 may be implemented using other types of hardware devices without departing embodiment disclosed herein.

In an embodiment, any of management controller 102 and/or end point presenting device 220, 230, 240 are implemented using a processor adapted to execute computing code stored on a persistent storage that when executed by the processor performs the functionality of management controller 102 and/or end point presenting device 220, 230, 240 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, any of management controller 102 and/or end point presenting device 220, 230, 240 include storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures discussed herein. Any of these data structures may be implemented using, for example, lists, tables databases, linked lists, unstructured data, and/or other types of data structures.

As discussed above, the components of FIG. 1 may perform various methods to manage operation of data processing systems. FIGS. 3A-3B illustrate methods that may be performed by the components of the system of FIG. 1. In the diagram discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing end point presenting devices in accordance with an embodiment is shown. The method may be performed by any of data processing systems 100, management controller 102, management system 106, and/or other components of the system shown in FIG. 1.

At operation 300, a communication is obtained from a management system. The communication may indicate invocation of a function of an end point presenting device which is unreachable by the management system directly.

The communication may be obtained by presenting a management system interface to the management system. The management system interface may indicate that the function of the end point presenting device may be invoked through the management system interface. The communication may be sent by the management system and directed to the management system interface.

For example, the management system may query or otherwise access the management system interface. When accessed, the management system may be presented with information regarding functions of the end point presenting device that may be invoked. The management system may include native functionality to utilize the management system interface, and may do so in accordance with a communication scheme. However, the end point presenting device may not include native functionality to interpret communication in accordance with that communication scheme. Rather, the end point presenting device may utilize a different communication scheme for management communication.

At operation 302, a device interface to an end point presenting device is identified. The device interface may be one of multiple device interfaces that facilitate communications with multiple end point presenting devices hosted by a data processing system.

The device interface may be identified based on the communication. For example, the communication may include an identifier or other information usable to identify the end point presenting device or the device interface for communication with the end point presenting device.

At operation 304, the communication is translated to a natively interpretable communication for the end point presenting device. The communication may be translated by invoking functionality of the identified device interface.

At operation 306, the natively interpretable communication is provided to the end point presenting device. Providing the natively interpretable communication may cause the end point presenting device to perform a function specified by the communication obtained in operation 300.

The method may end following operation 306.

Using the method shown in FIG. 3A, any number of communications may be received by a single interface and translated/routed to corresponding end point presenting devices without exposing multiple end points to a management system that generated the communications. Consequently, the management system may only need to include functionality to utilize and communicate with the single interface. Accordingly, the overhead for managing multiple end point presenting devices may be reduced by consolidating interaction with the end point presenting devices into a single interface that is extensible to any number of end point presenting devices.

Turning to FIG. 3B, a flow diagram illustrating a method of managing presentation of a management interface in accordance with an embodiment is shown. The method may be performed by any of data processing systems 100, management controller 102, management system 106, and/or other components of the system shown in FIG. 1.

At operation 310, end point presenting devices hosted by a data processing system are enumerated. The end point presenting devices may be enumerated by performing a discovery process. During the discovery process, communication channels between a management controller at other devices may be characterized to identify whether any end point presenting devices are operably connected via the communication channels. A list of end point presenting devices or other type of representation may be obtained via the discovery process.

At operation 312, device interfaces for each of the end point presenting devices are established based on the enumerated end point presented devices. The device interfaces may be established by (i) obtaining APIs or other software packages corresponding to the end point presenting devices, and (ii) instantiating the device interfaces using the APIs. The APIs may facilitate communication translation, and present functionality of the end point presenting devices to a management system interface.

The APIs or other software packages may be obtained, for example, from a trusted entity. The trusted entity may be manufacturer of the end point presenting devices, a publisher, or another entity. The trusted entity may provide the APIs and publish them for viewing.

In the event that an API that explicitly matches each end point presenting device, a matching process may be performed to identify one of the APIs. In such a scenario, the matched API may not be uniquely associated with the corresponding type of the end point presenting device. For example, the matched API may be generalized (e.g., may be matched against a manufacturer rather than a model number, part number, etc.).

At operation 314, the end point presenting devices are advertised to a management system. The end point presenting devices may be advertised by modifying the management system interface based on the APIs. For example, the management system interface may be modified to present invokable functionalities of the end point presenting devices. Thus, a management system that utilizes the management system interface may be made aware of the functionality of the end point presenting devices, as well as their availability functionalities, statuses, etc.

At operation 316, the management system interface is presented to the management system. The management system interface may be presented by, for example, making it accessible to the management system.

The method may end following operation 316.

Figure 4:
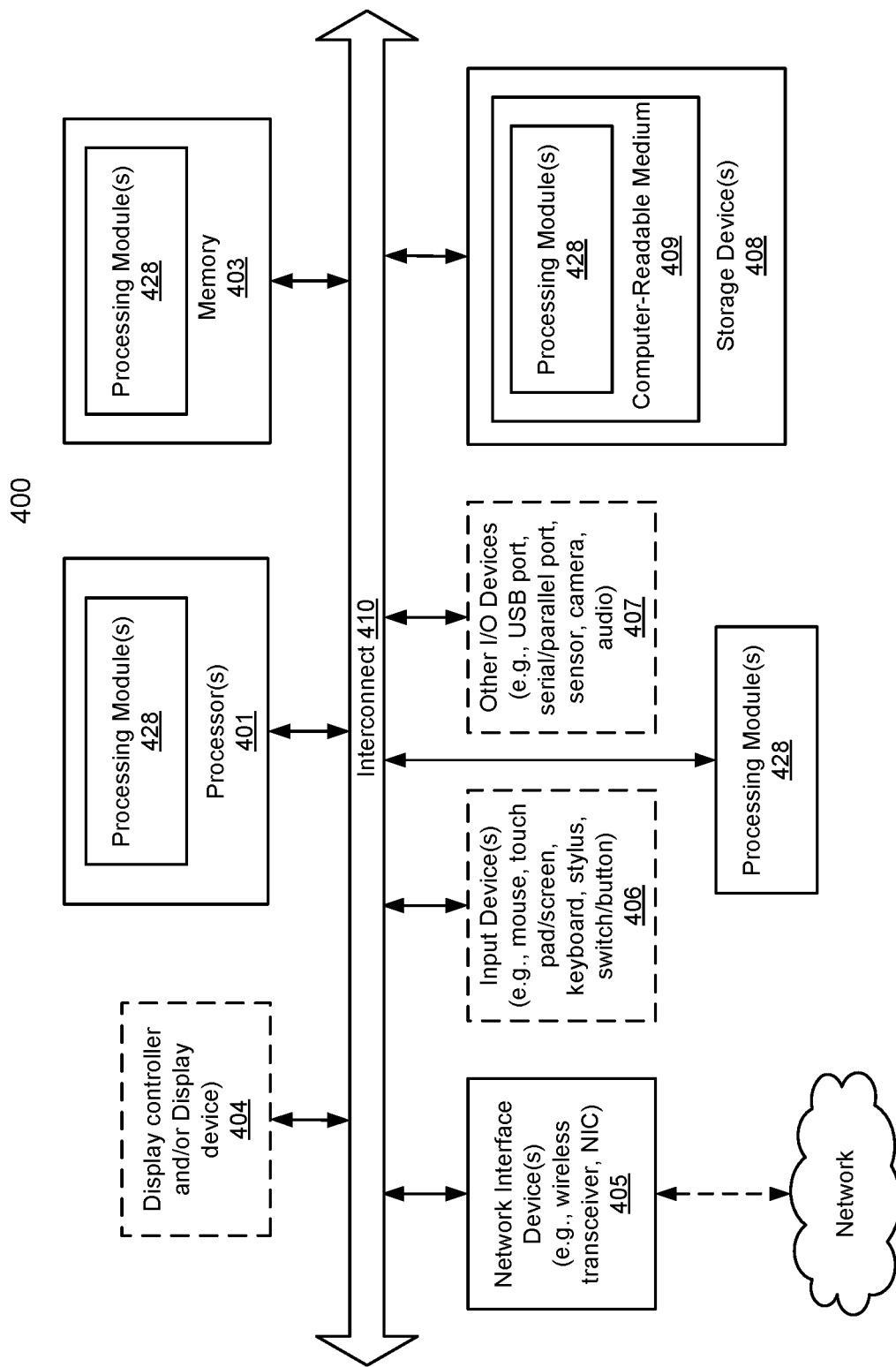
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OSR/iOS® from Apple, Android® from Google®, Linux, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing communications between a management system and end point presenting devices, the method comprising:
 obtaining, by a management controller of a data processing system, a communication from the management system, the data processing system being a computing device with a physical body, the management controller being a microcontroller comprising a processor that is separate and distinct from a processor of the data processing system in which the management controller is installed;
 identifying, by the management controller, a device interface connecting the management controller to an end point presenting device of the end point presenting devices, each of the end point presenting devices and the management controller are hosted by the data processing system as one or more hardware devices installed within the physical body of the data processing system, each of the end point presenting devices comprises an external facing interface that is able to present each of the end point presenting devices to the management system for direct connection and communication with the management system without going through the management controller, but the management controller forces each of the end point presenting devices to connect and communicate with the management system only and indirectly through a management system interface of the management controller instead of through the external facing interface of each of the end point presenting devices;
 translating, by the management controller and via the device interface, the communication to a natively interpretable communication by the end point presenting device; and
 providing, by the management controller and via the device interface, the natively interpretable communication to the end point presenting device.

2. The method of claim 1, further comprising:
 prior to obtaining the communication:
  enumerating, by the management controller, the end point presenting devices;
  establishing, by the management controller and based on the enumerated end point presenting devices, the device interface for each of the end point presenting devices;
  advertising, by the management controller, the end point presenting devices to the management system; and
  presenting, by the management controller, a management system interface to the management system,
 wherein the end point presenting device is a smart network interface card (smart NIC) installed within the data processing system.

3. The method of claim 2, wherein the management system interface present a unified interface for communication with all of the end point presenting devices and the data processing system.

4. The method of claim 3, wherein the management system interface comprises a Representational State Transfer (REST) Application Programming Interface (API).

5. The method of claim 4, wherein the device interface comprises an API based on capabilities of the end point presenting device, and the REST API advertises the end point presenting device based on the API.

6. The method of claim 5, wherein establishing the device interfaces comprises:
 identifying, by the management controller, an instance of the API published by a trusted entity; and
 generating the device interface based on the instance of the API.

7. The method of claim 6, wherein the instance of the API is identified by performing a matching operation that does not uniquely associate the instance of the API with a type of the end point presenting device.

8. A non-transitory machine-readable medium having instructions stored therein, which when executed by data processing system, cause the data processing system to perform operations for managing communications between a management system and end point presenting devices, the operations comprising:
 obtaining, by a management controller of the data processing system, a communication from the management system, the data processing system being a computing device with a physical body, the management controller being a microcontroller comprising a processor that is separate and distinct from a processor of the data processing system in which the management controller is installed;
 identifying, by the management controller, a device interface connecting the management controller to an end point presenting device of the end point presenting devices, each of the end point presenting devices and the management controller are hosted by the data processing system as one or more hardware devices installed within the physical body of the data processing system, each of the end point presenting devices comprises an external facing interface that is able to present each of the end point presenting devices to the management system for direct connection and communication with the management system without going through the management controller, but the management controller forces each of the end point presenting devices to connect and communicate with the management system only and indirectly through a management system interface of the management controller instead of through the external facing interface of each of the end point presenting devices;
 translating, by the device interface, the communication to a natively interpretable communication by the end point presenting device; and
 providing, by the device interface, the natively interpretable communication to the end point presenting device.

9. The non-transitory machine-readable medium of claim 8, wherein the operations further comprise:
 prior to obtaining the communication:
  enumerating, by the management controller, the end point presenting devices;
  establishing, by the management controller and based on the enumerated end point presenting devices, the device interface for each of the end point presenting devices;
  advertising, by the management controller, the end point presenting devices to the management system; and
  presenting, by the management controller, a management system interface to the management system.

10. The non-transitory machine-readable medium of claim 9, wherein the management system interface present a unified interface for communication with all of the end point presenting devices and the data processing system.

11. The non-transitory machine-readable medium of claim 10, wherein the management system interface comprises a Representational State Transfer (REST) Application Programming Interface (API).

12. The non-transitory machine-readable medium of claim 11, wherein the device interface comprises an API based on capabilities of the end point presenting device, and the REST API advertises the end point presenting device based on the API.

13. The non-transitory machine-readable medium of claim 12, wherein establishing the device interfaces comprises:
identifying, by the management controller, an instance of the API published by a trusted entity; and
generating the device interface based on the instance of the API.

14. The non-transitory machine-readable medium of claim 13, wherein the instance of the API is identified by performing a matching operation that does not uniquely associate the instance of the API with a type of the end point presenting device.

15. A data processing system, comprising:
a first processor;
end point presenting devices; and
a management controller, wherein the data processing system is a computing device comprising a physical body in which the first processor, the end point presenting devices, and the management controller are installed as one or more pieces of hardware, and wherein the management controller is a microcontroller comprising:
a second processor different from the first processor; and
a memory coupled to the second processor to store instructions, which when executed by the second processor, cause the second processor to perform operations for managing communications between a management system and the end point presenting devices, the operations comprising:
obtaining a communication from the management system;
identifying a device interface connecting the management controller to an end point presenting device of the end point presenting devices, each of the end point presenting devices comprises an external facing interface that is able to present each of the end point presenting devices to the management system for direct connection and communication with the management system without going through the management controller, but the management controller forces each of the end point presenting devices to connect and communicate with the management system only and indirectly through a management system interface of the management controller instead of through the external facing interface of each of the end point presenting devices;
translating the communication to a natively interpretable communication by the end point presenting device; and
providing the natively interpretable communication to the end point presenting device.

16. The data processing system of claim 15, wherein the operations further comprise:
prior to obtaining the communication:
enumerating, by the management controller, the end point presenting devices;
establishing, by the management controller and based on the enumerated end point presenting devices, the device interface for each of the end point presenting devices;
advertising, by the management controller, the end point presenting devices to the management system; and
presenting, by the management controller, a management system interface to the management system.

17. The data processing system of claim 16, wherein the management system interface present a unified interface for communication with all of the end point presenting devices and the data processing system.

18. The data processing system of claim 17, wherein the management system interface comprises a Representational State Transfer (REST) Application Programming Interface (API).

19. The data processing system of claim 18, wherein the device interface comprises an API based on capabilities of the end point presenting device, and the REST API advertises the end point presenting device based on the API.

20. The data processing system of claim 19, wherein establishing the device interfaces comprises:
identifying, by the management controller, an instance of the API published by a trusted entity; and
generating the device interface based on the instance of the API.

* * * * *